United States Patent
Bolla et al.

(10) Patent No.: US 6,760,433 B2
(45) Date of Patent: Jul. 6, 2004

(54) CENTRAL OFFICE INTERFACE TECHNIQUES FOR DIGITAL SUBSCRIBER LINES

(75) Inventors: Mark A. Bolla, Richardson, TX (US); Serdar Kiykioglu, Plano, TX (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 10/160,296

(22) Filed: May 30, 2002

(65) Prior Publication Data

US 2002/0181697 A1 Dec. 5, 2002

Related U.S. Application Data

(63) Continuation-in-part of application No. 09/866,498, filed on May 25, 2001, and a continuation-in-part of application No. 09/570,804, filed on May 15, 2000.
(60) Provisional application No. 60/303,301, filed on Jul. 5, 2001, and provisional application No. 60/250,531, filed on Nov. 29, 2000.

(51) Int. Cl.[7] .............................................. H04M 9/00
(52) U.S. Cl. ............................. 379/399.01; 379/399.02
(58) Field of Search ...................... 379/399.01, 399.02; 371/399.01, 399.02

(56) References Cited

U.S. PATENT DOCUMENTS

| | | | |
|---|---|---|---|
| 3,828,281 A | | 8/1974 | Chambers, Jr. |
| 3,973,089 A | * | 8/1976 | Puckette |
| 4,046,969 A | | 9/1977 | Dalley |
| 4,414,435 A | * | 11/1983 | Parlor |
| 4,439,634 A | | 3/1984 | Blackburn |
| 4,646,319 A | | 2/1987 | Engel et al. |
| 4,764,922 A | * | 8/1988 | Dieter et al. |
| 4,899,382 A | * | 2/1990 | Gartner |
| 5,249,224 A | | 9/1993 | Chambers |

(List continued on next page.)

FOREIGN PATENT DOCUMENTS

| | | |
|---|---|---|
| EP | 0 346 874 A2 | 12/1989 |
| EP | 1 156 655 A2 | 11/2001 |
| EP | 1 175 077 A2 | 1/2002 |
| WO | WO 00/74328 A2 | 12/2000 |
| WO | WO 00/78013 A1 | 12/2000 |

OTHER PUBLICATIONS

Infineon Technologies AG—Products—B–MuSLIC, [online]. [Retrieved on May 17, 2001]. Retrieved from the Internet: <URL: http://www.infineon.com/cgi/ecrm.dll/ecrm/scripts/prod_ov.jsp?oid=13670>, 1 page.

Aalaei, et al., "Splitterless DSL and the Myth of Multi–Mode," White Paper, Sep. 1999, 8 pages. Retrieved from the Internet: <URL: http://www.infineon.com/cmc_upload/migrated_files/document_files/Others/Glite_wpl.pdf>.

ICs for Communications, "Broadband Multichannel Subscriber Line–Interface Circuits for Splitterless G.Lite Applications," Preliminary Product Overview 05.99, May 1999, pp. 1–51. Retrieved from the Internet: <URL: http://www.infineon.com/cmc_upload/migrated_files/document_files/Product_Family_Overview/bmslc_o.pdf>.

Siemens, "Broadband–Multi Channel Subscriber Line Interface Concept," Product Brief B–MuSLIC, [online] Nov. 1998, 2 pages. Retrieved from the Internet: <URL: http://www.siemens.de/semiconductor/communication>.

(List continued on next page.)

Primary Examiner—F. W. Isen
Assistant Examiner—Ramnandan Singh
(74) Attorney, Agent, or Firm—Fenwick & West LLP (57) ABSTRACT

Techniques for interfacing a telephone line and central office equipment of a network operator providing and digital subscriber line data services are disclosed. The interface is splitterless in that no conventional bulky splitter is required. A SLIC independent, impedance synthesis network provide compensation for impedance imbalance caused by capacitor coupled across two-wire interface of voice circuit.

12 Claims, 6 Drawing Sheets

U.S. PATENT DOCUMENTS

| | | | |
|---|---|---|---|
| 5,343,520 | A | 8/1994 | Willocx et al. |
| 5,504,807 | A * | 4/1996 | Sattler et al. |
| 5,621,359 | A | 4/1997 | Evert |
| 5,841,841 | A | 11/1998 | Dodds et al. |
| 5,889,856 | A | 3/1999 | O'Toole et al. |
| 5,949,085 | A | 9/1999 | Barrett |
| 6,008,976 | A | 12/1999 | Pisterzi |
| 6,101,216 | A | 8/2000 | Henderson et al. |
| 6,141,377 | A | 10/2000 | Sharper et al. |
| 6,151,335 | A | 11/2000 | Ko et al. |
| 6,185,280 | B1 | 2/2001 | Jarboe et al. |
| 6,266,348 | B1 | 7/2001 | Gross et al. |
| 6,269,154 | B1 * | 7/2001 | Chellali et al. |
| 6,295,343 | B1 | 9/2001 | Hjartarson et al. |
| 6,314,180 | B1 | 11/2001 | Bingel |
| 6,345,071 | B1 | 2/2002 | Hamdi |
| 6,373,277 | B1 | 4/2002 | Felder |
| 6,396,922 | B1 * | 5/2002 | Khuat |
| 6,456,650 | B1 * | 9/2002 | Cheng et al. |
| 6,520,744 | B1 | 2/2003 | Verbin et al. |

OTHER PUBLICATIONS

"B–MuSLIC—A Unique Concept for Splitterless Integrated Voice–Data (IVD) Transmission," Nov. 1998, 11 pages. Retrieved from the Internet: <URL: http://www.infineon.com/cmc_upload/migrated_files/document_files/Others/bmslc_wp.pdf>.

Cook, et al., "ADSL and VADSL Splitter Design and Telephony Performance," IEEE Journal on Selected Areas in Communications, vol. 13, No. 9, Dec. 1995, pp. 1634–1642.

PCT International Search Report, International Application No. PCT/US02/21053, Oct. 29, 2002, 3 pages.

PCT International Search Report, International Application No. PCT/US02/39103, Mar. 28, 2003, 5 pages.

Liu, "Universal Filter Using Two Current–Feedback Amplifiers," Electronics Letters, vol. 13, No. 8, Apr. 13, 1995, pp. 629–630.

PCT International Search Report, International Application No. PCT/US02/21053, Oct. 29, 2002, 3 pages.

PCTInternational Preliminary Examination Report, Application No. PCT/US01/43319, Nov. 12, 2003, 9 pages.

* cited by examiner

CENTRAL OFFICE INTERFACE TECHNIQUES FOR DIGITAL SUBSCRIBER LINES

RELATED APPLICATIONS

This application claims the benefit of U.S. Provisional Application No. 60/303,301, filed Jul. 5, 2001, and is a continuation-in-part of U.S. application Ser. No. 09/866,498, filed May 25, 2001 (which claims the benefit of U.S. Provisional Application No. 60/250,531, filed Nov. 29, 2000), and is also a continuation-in-part of U.S. application Ser. No. 09/570,804, filed May 15, 2000. Each of these applications is herein incorporated in its entirety by reference.

FIELD OF THE INVENTION

The invention relates to telecommunications, and more particularly, to a digital subscriber line and voice interface between a telephone line and central office equipment of a network operator providing voice and digital subscriber line data services.

BACKGROUND OF THE INVENTION

A conventional telephone transmission line is typically comprised of a pair of copper conductors that connect a telephone set to the nearest central office, digital loop carrier equipment, remote switching unit or any other equipment serving as the extension of the services provided by the central office. This pair of copper conductors, which is also referred to as a twisted pair, has its leads named as tip and ring. The tip and ring nomenclature is derived from the electrical contacts of an old-style telephone plug. A number of such twisted pairs are generally bundled together within the same cable binder group.

The demand for high bandwidth data transmission over existing telephone transmission lines has led to the development of digital subscriber line (DSL) technology. Several variations of DSL technology (referred to generically as xDSL or simply DSL) are evolving, such as SHDSL (symmetric high-bit-rate DSL), HDSL2 (second-generation high-bit-rate DSL), RADSL (rate adaptive DSL), VDSL (very high-bit-rate DSL), and ADSL (asymmetric DSL). In general, a digital subscriber line is comprised of two DSL modems coupled to one another by a twisted pair. The transmit (Tx) and receive (Rx) signals of DSL communications are carried by the twisted pair.

Some DSL technologies, such as ADSL, have the advantage that voice data transmissions (commonly referred to as Plain Old Telephone Service or POTS) can share the same telephone line with DSL data transmissions. The lower frequency band of the telephone line is used for voice data, while the upper frequency bands are used for digital data. However, because each of these frequency bands operates on the same phone line, such DSL technology employs a splitter to isolate the signals of each band. More specifically, the splitter isolates the low-frequency components (e.g., POTS data) of the transmission, and the high-frequency components (e.g., DSL data) of the transmission. The splitter also operates as a mixer to combine the high-frequency digital data with the low-frequency voice data, and provides the combined signal to the telephone line.

A problem with this splitter approach is that the passive elements (e.g., inductors and capacitors) that are typically used to implement the low and high pass filters of the splitter are bulky and cumbersome. This added bulk requires more physical space to house the splitter, and consequently occupies more physical space in the central office of the telephone company. In the aggregate, the physical space consumption resulting from this approach is costly. Also, this approach is associated with additional material and manufacturing costs involved in building the splitters, as well as costs associated with deploying those splitters.

A silicon broadband subscriber line interface circuit (SLIC), on the other hand, provides an active discrete splitter that is more compact than a passive splitter. However, such technology requires a high-voltage, high-speed silicon process and consumes significantly more power thereby limiting the service circuit line density. Moreover, this approach requires an additional power backup in order to sustain the supported communication channels for the same time period compared to that of a POTS only service in the event of a power failure.

What is needed, therefore, is an improved digital subscriber line and voice interface between a telephone line and central office equipment of a network operator providing voice and digital subscriber line data services

SUMMARY OF THE INVENTION

Techniques for interfacing a telephone line and central office equipment of a network operator providing voice and digital subscriber line data services are disclosed. The interface is splitterless in that no conventional bulky splitter is required. A SLIC independent, impedance synthesis network provides compensation for impedance imbalance caused by a capacitor coupled across two-wire interface of voice (e.g., POTS) circuit. The synthesized impedance is frequency variant so that it only affects a specific band of frequencies (e.g., the POTS band frequencies). For frequencies outside that specific band of frequencies, the synthesized impedance is muted so that its effect is essentially disabled. One reason for this frequency variant quality is that the capacitor is desired to be electrically present within the DSL frequency band for purposes of isolating DSL band signals from voice band signals. The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
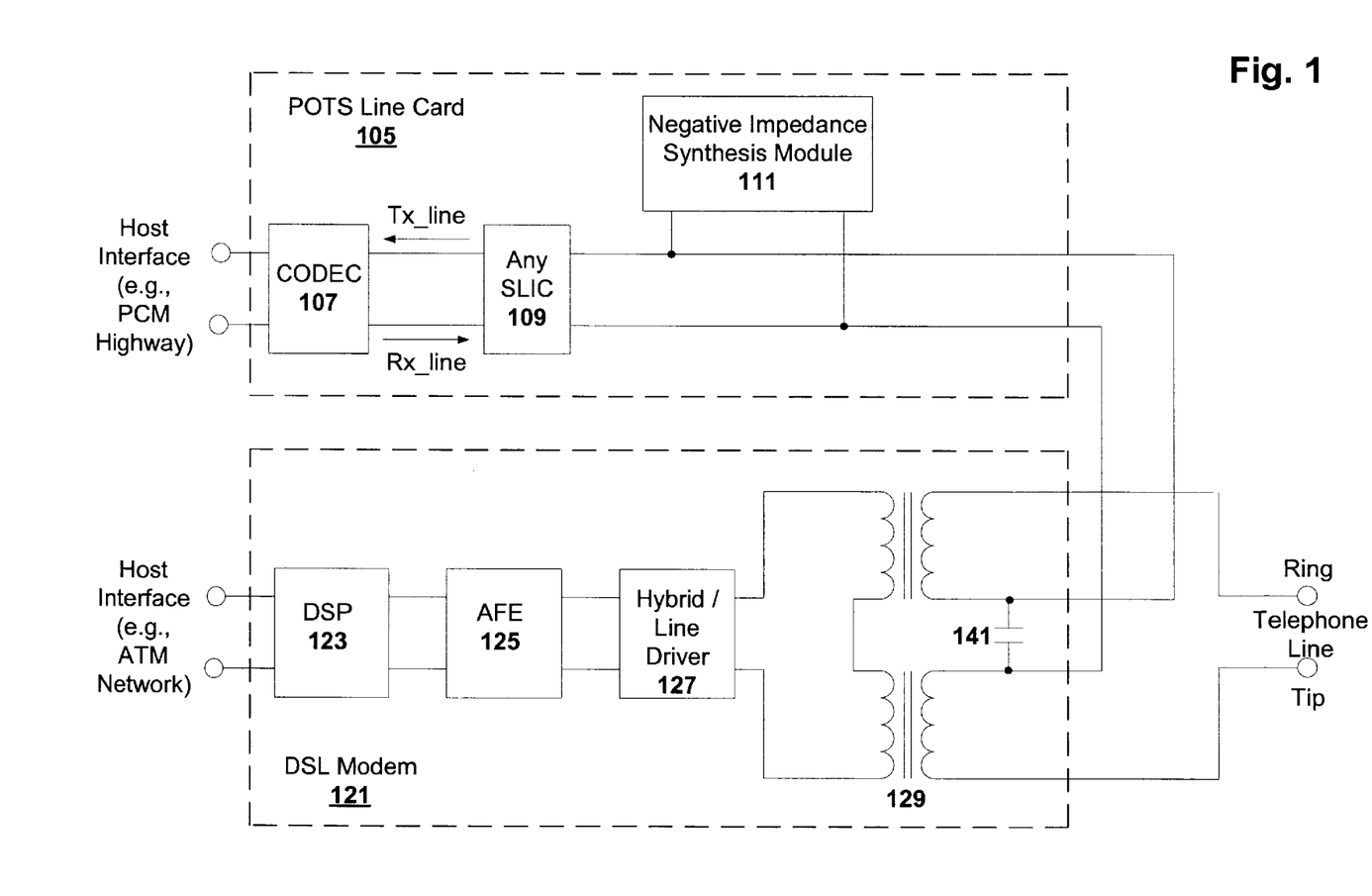
FIG. 1 is a block diagram of a central office interface for a digital subscriber line in accordance with one embodiment of the present invention.

FIG. 1 is a block diagram of a central office interface for a digital subscriber line in accordance with one embodiment of the present invention. As can be seen, the interface is between a telephone line and central office equipment of a network operator providing voice and digital subscriber line data services, and includes a POTS voice circuit and a DSL circuit. Other circuitry not shown in FIG. 1 may also be included, such as ringing circuitry (e.g., ringing source and couplers), high voltage protection circuitry, and line probing circuitry. The voice circuitry and the DSL circuitry can be implemented as individual modules as shown (e.g., POTS line card 105 and DSL modem 121). However, other configurations will be apparent in light of this disclosure (e.g., a single discrete assembly such as a printed circuit board, or individual integrated circuits or chip sets).

DSL circuit 121 is comprised of digital signal processor (DSP) 123, analog front-end (AFE) 125, hybrid/line driver 127, and transformer 129. Transformer 129 includes DC blocking capacitor 141. DSL circuit 121 can, for example, employ asymmetric DSL (ADSL) technology or other DSL-based technologies.

Generally, this modem performs conventional modem processing, such as converting the analog signal received from the telephone line to its digital equivalent, decoding, demodulating, descrambling, error checking, amplifying, and filtering. The processed data is then applied to the host interface, which is typically an operator's network or backbone. In the embodiment shown, the asynchronous transfer mode (ATM) protocol is implemented by the host interface. Those skilled in the art will recognize other protocols that can be implemented here as well. Complementary processes are provided by DSL circuit 121 for data being transmitted from the host interface onto the telephone line (e.g., encoding, modulating, scrambling, amplifying, filtering, and digital to analog conversion).

Transformer 129 is a balanced interface for coupling the line to the DSL circuitry. DC blocking capacitor 141 is connected between the windings on the line side of transformer 129. This DC blocking capacitor 141 prevents DC current from flowing through the line side of the transformer. Thus, any DC component of the signal received from the telephone line will not cause coupling transformer 129 to saturate. Recommendations G.992.1 and G.992.2 of the Telecommunications Standards Section of the International Telecommunication Union (commonly designated as ITU-T) each define specifications for such a DC blocking capacitor. Each of these recommendations is herein incorporated by reference in its entirety. Each of DSP 123, AFE 125, hybrid/line driver 127, and transformer 129 can be implemented with conventional technology.

POTS circuit 105 is comprised of a subscriber line interface circuit (SLIC) 109, a negative impedance synthesis module 111, and a programmable CODEC 107. Any SLIC 109 is used for interfacing the telephone line with programmable CODEC 107, and converts the bi-directional two-wire (tip and ring) signal from the telephone line into two pairs of one-directional transmissions. One pair is for receiving and the other pair is for transmitting. SLIC 109 may also include other functionality. For example, SLIC 109 may include DC signaling circuits to establish, control and terminate calls. It may also include a ring generator and or an off-hook detector. Note that for purposes of simplicity, the transmit ground output of SLIC 109, which is the reference to the transmit line (Tx_line), is not shown. Similarly, the receive ground input of SLIC 109, which is the reference to the receive line (Rx_line), is not shown.

Negative impedance synthesis module 111 is effectively coupled in parallel with DC blocking capacitor 141. This module 111 actively synthesizes a negative impedance thereby compensating for the impedance mismatch caused by connecting the capacitor 141 across the two-wire interface of the POTS circuit 105. The negative impedance synthesis module 111 acts as the predominant compensation factor thereby providing a generic solution, independent of the SLIC 109 type. The synthesized negative impedance is frequency variant in that it only affects a specific band of frequencies (e.g., the POTS band frequencies). For frequencies outside that specific band, the synthesized negative impedance is muted (e.g., gradually reduced and nulled above a preset frequency) so that the negative impedance's effect is essentially disabled at those frequencies. One reason for this frequency variant quality is that the physical capacitance 141 is desired to be present within the higher DSL frequency band to provide a high-pass filtering effect that inhibits DSL frequency band signals from entering the POTS circuit 105.

Programmable CODEC 107 receives the Tx_line from SLIC 109, and also provides the Rx_line to SLIC 109. In one respect, CODEC 107 is used to convert analog POTS band signals received from the line to their digital equivalent. In another respect, CODEC 107 is used to convert digital POTS band signals received from the host interface to their analog equivalent for transmission onto the line. CODEC 107 may also have additional features, such as voice compression and decompression capabilities. CODEC 107 is operatively coupled to the host interface, which in the embodiment shown is a pulse coded modulation (PCM) highway for transmission to other central offices. Those skilled in the art will recognize other protocols that can be implemented here as well.

In addition, programmable CODEC 107 includes DSP filter circuitry and can be programmed to synthesize desired transmission characteristics. CODEC 107 can also be programmed to compensate for physical components connected to the two-wire interface of the POTS circuit 105 (in conjunction with negative impedance synthesis module 111). In general, a software tool with integrated circuit simulation program (e.g., PSPICE or other simulation software) is available from the CODEC 107 supplier. This program can be used to calculate and simulate the necessary DSP code to implement the desired transmission characteristics. Once the desired transmission characteristics are identified and the physical circuit network is modeled, the simulation program can be used to obtain the desired performance from POTS circuit 105. The DSP filter coefficients can then be calculated thereby allowing the programmable CODEC 107 to synthesize the desired circuit response.

Splitterless Interface

The present invention eliminates the need for a conventional bulky splitter (for isolating the voice and DSL signals), and the telephone line is coupled across the line side of coupling transformer 129 of the central office DSL circuit 121. DC blocking capacitor 141 is serially coupled to the line side of transformer 129. As there is no splitter, the two-wire interface of the POTS circuit 105 is connected across capacitor 141. The reactance of capacitor 141, in conjunction with the reactance of the magnetizing inductance of transformer 129, provides a splitter function between the POTS and DSL circuits.

More specifically, the reactance of capacitor 141 decreases as frequency increases effectively creating a short-circuit, where as the reactance of capacitor 141 increases as frequency decreases effectively creating an open-circuit. Thus, at low frequencies (e.g., POTS band frequencies), the reactance of capacitor 141 represents an open state, and at high frequencies (e.g., DSL band frequencies), the reactance of capacitor 141 represents a closed state. An opposite condition applies to the windings of coupling transformer 129. As frequency decreases, the windings' reactance (also referred to as the reactance of the magnetizing inductance) decreases. Likewise, as frequency increases, the windings' reactance increases. The line side windings of the coupling transformer are effectively in series with the capacitor.

Ideally, capacitor 141 would be a perfect open-circuit (e.g., infinite reactance) at frequencies in the POTS band, and would be a perfect short-circuit (e.g., zero reactance) at frequencies in the DSL bands. At POTS band frequencies, the line side of transformer 129 would therefore be open-circuited by the infinite reactance of capacitor 141. As such, the POTS circuit 105 would consequently receive the entire POTS signal power from the telephone line. On the other hand, the POTS circuit 105 would be short-circuited by the zero reactance of capacitor 141 at DSL band frequencies. As such, the DSL circuit 121 would receive the entire DSL signal power from the telephone line.

Assuming ideal conditions are not practical, a more realistic approach is provided. For POTS band frequencies, the reactance of capacitor 141 is in its high or open state, and the reactances of the windings are effectively short-circuits (closed state). At POTS band frequencies, therefore, the POTS circuit 105 interfaces with the line as if the DSL circuit 121 is not present. For DSL frequencies, the reactance of capacitor 141 is in its low or closed state, and the reactances of the windings are effectively open-circuits (open state). At DSL band frequencies, therefore, the DSL circuit 121 interfaces with the line as if the POTS circuit 105 is not present. Thus, capacitor 141 and line side windings of coupling transformer 129 provide the functionality of a splitter.

Figure 3:
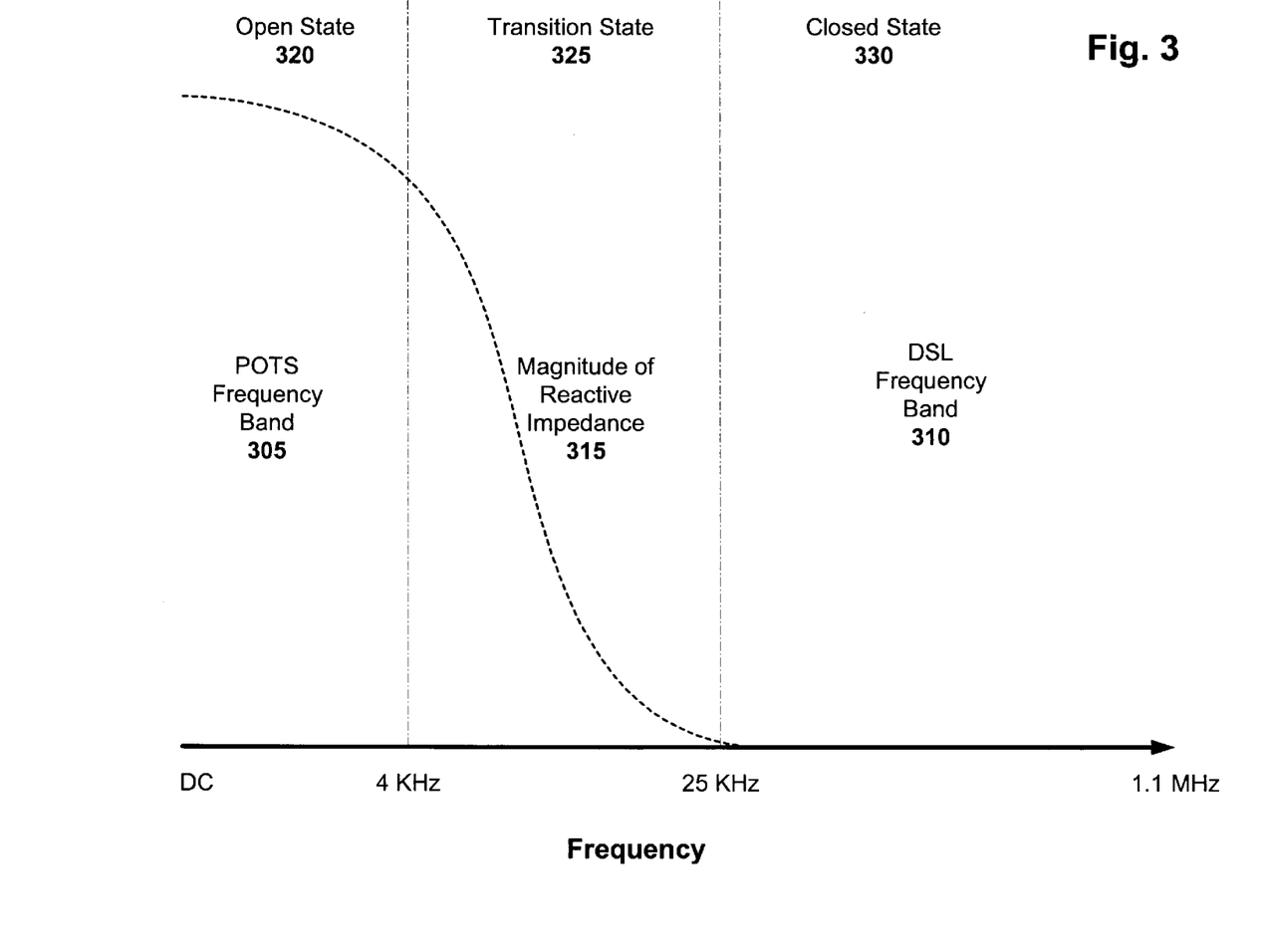
FIG. 3 illustrates example voice and DSL frequency bands, and how each band relates to the magnitude of the DC blocking capacitor's reactive impedance in accordance with one embodiment of the present invention.

FIG. 3 illustrates example voice and DSL frequency bands, and how each band relates to the magnitude of the DC blocking capacitor's 141 reactive impedance in accordance with one embodiment of the present invention. Note that the gap in the frequency spectrum between the POTS frequency band 305 and the DSL frequency band 310 provides the DC blocking capacitor 141 an inter-state range (transition state 325) for transitioning from a reactive impedance having a high magnitude (open state 320) to a reactive impedance having a low magnitude (closed state 330).

In one embodiment, capacitor 141 has a value in a range as specified by ITU-T Recommendations G.992.1 and G.992.2 (e.g., 20 to 35 nanofarads). In other embodiments, capacitor 141 has a larger value (e.g., 35 nanofarads to 0.5 microfarads). Note that the actual selected value of capacitor 141 depends on factors such as the desired sound quality of the communication channel, the desired level of attenuation of DSL signals entering the POTS band, the desired frequency response of DSL signals, and given industry regulations.

As the value of capacitor 141 increases, the level of attenuation of DSL signals entering the POTS band increases. However, while increased capacitance provides better frequency response for the DSL band, it disturbs the structural impedance of the POTS band. As such, a negative capacitance may be needed to compensate for the effect of capacitor 141 on the structural impedance of the POTS band.

In more detail and by way of example, the structural impedance of POTS circuit 105 is typically about 900 ohms in series with a 2.16 microfarad capacitance for applications in the United States. Connecting the capacitor 141 across the two-wire interface of POTS circuit 105 causes a two-wire and four-wire impedance mismatch and degraded transmission characteristics (e.g., as set forth by the applicable standards such as Bellcore or equivalent standards). This generally results in a less than optimal sound quality of the POTS communication channel.

As previously explained, this impedance mismatch can generally be compensated for by properly programming CODEC 107 to synthesize the proper two-wire and four-wire impedance, and the proper transmit and receive path frequency equalization. Thus, a full DSP implementation may be possible without requiring negative impedance synthesis. In such a case, note that negative impedance synthesis module 111 is unnecessary. In one embodiment, negative impedance synthesis module 111 can be disabled so that it is effectively removed from the POTS circuit 105 is so desired. A conventional switching scheme, for example, can be employed to disable module 111.

In some embodiments, however, limitations associated with the given CODEC 107 (e.g., DSP filter circuitry limitations) may require additional compensation circuitry in order to achieve optimal sound quality of the POTS communication channel. For instance, CODEC 107 may have been designed to synthesize structural impedance values in a limited fashion, such as the 900 ohms resistance in series with 2.16 microfarads of capacitance. As such, larger values of DC blocking capacitor 141 across the two-wire interface of the POTS circuit 105 may be too large for the rated capacity of the DSP filter inside the CODEC thereby causing an unacceptable degree of impedance mismatch. In such a case, negative impedance synthesis module 111 synthesizes a negative impedance thereby effectively adjusting the impedance mismatch caused by capacitor 141 so that the resulting overall impedance mismatch is not beyond the scope of the rated capacity of the DSP filter inside CODEC 107.

Thus, negative impedance synthesis module 111 essentially nulls or otherwise adjusts (e.g., reduces or increases) the reactive impedance associated with the DC blocking capacitor 141. The negative impedance synthesis module 111 is discussed in greater detail with reference to FIGS. 2a, 2b, and 4. CODEC 107 can perform any additional compensation that may be necessary (e.g., fine tuning compensation). Recall, however, that the synthesized negative impedance is muted with respect to the DSL frequency band.

SLIC Independent

Figure 2A:
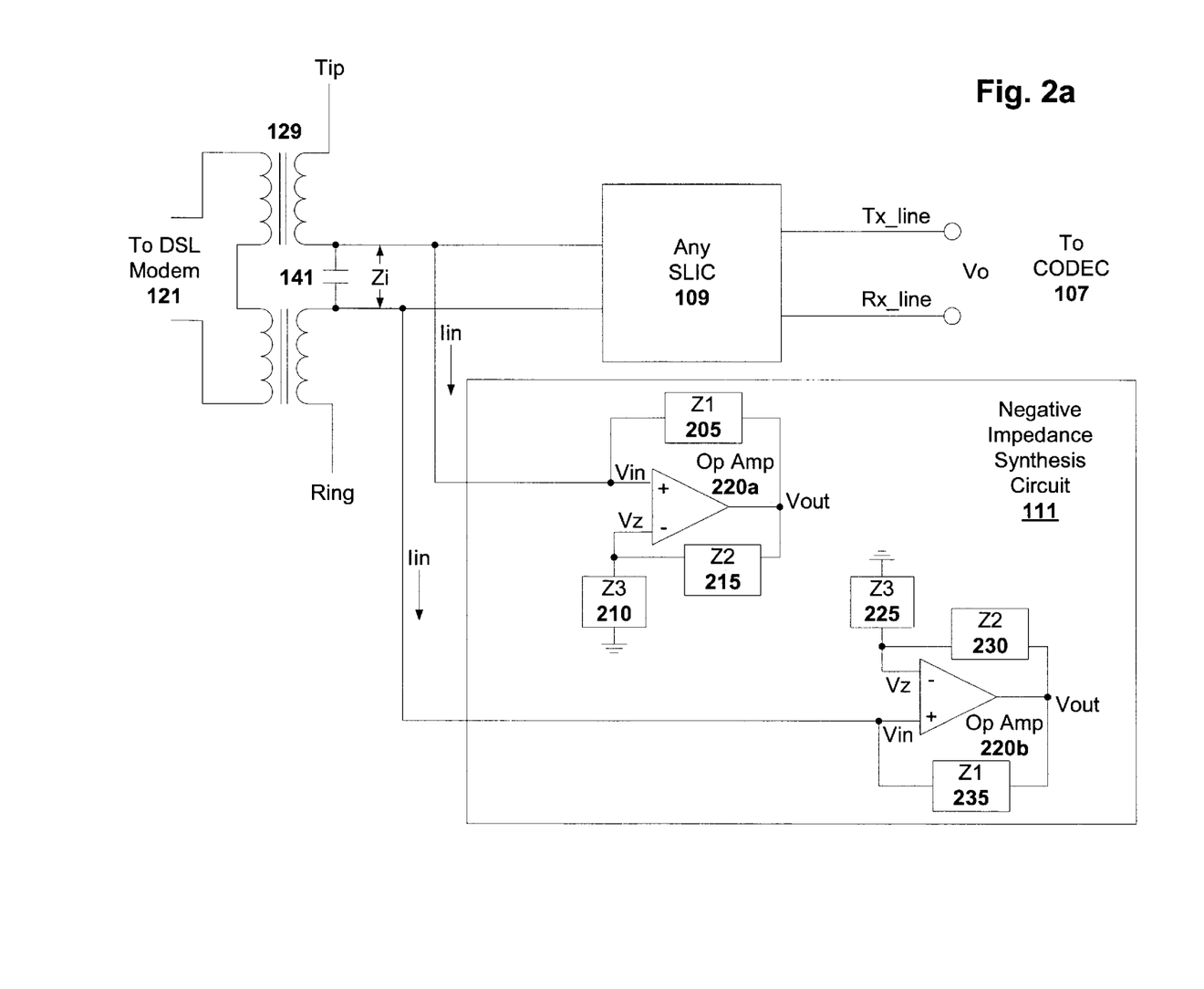
FIG. 2a illustrates a negative impedance synthesis circuit topology in accordance with one embodiment of the present invention.

Note that the present invention provides a synthesized negative impedance independently of the type of SLIC 109 employed in POTS circuit 105. FIG. 2a illustrates a negative impedance synthesis circuit topology in accordance with one embodiment of the present invention. This negative impedance synthesis circuit actively synthesizes a negative impedance thereby compensating for the impedance mismatch caused by connecting the capacitor 141 across the two-wire interface of the voice circuitry (e.g., Any SLIC 109).

The model of the negative impedance synthesis circuit shown includes two similarly configured operational amplifier (op amp) circuits: one associated with tip (op amp 220a, Z1 205, Z2 215, and Z3 210) and the other with ring (op amp 220b, Z1 235, Z2 230, and Z3 225). Each of the modeled op amp circuits performs similarly to provide a balanced solution. The forthcoming discussion equally applies to the both op amp circuits. In actual implementation, the two op amp circuits are coupled together by a common Z3 impedance, and neither Z3 210 or Z3 225 is ground referenced. The Z3 impedances are shown grounded for modeling purposes.

For the sake of clarity, note the following definitions:
Vin: Input voltage received from tip (220a) or ring (220b) at non-inverting input;
Vz: Voltage at inverting input;
Vo: Output voltage of transmit line (Tx_line);
Vout: Output voltage of the negative impedance synthesis circuit 111;
Iin: Input current received from (220a) or ring (220b);
K1: Scalar gain factor of Any SLIC 109;
K2: Scalar gain factor of Any SLIC 109;
Z1: Positive feedback impedance network;
Z2: Negative feedback impedance network;
Z3: Inverting input impedance network; and
Zi: Negative synthesized impedance at the tip and ring.

The negative synthesized impedance (Zi) at the tip and ring can be derived in the s domain as follows:

$$Vin=Vz=(Z3/(Z2+Z3))Vout;$$

$$Vout=((Z2+Z3)/Z3)Vin=1+(Z2/Z3);$$

$$Iin=(Vin-Vout)/Z1;$$

$$Iin=(Vin-(1+(Z2/Z3))Vin)/Z1;$$

$$Iin=-(Z2/Z3)Vin/Z1;$$

$$Zin=Vin/Iin=Vin/(-(Z2/Z3)Vin/Z1)=1/-(Z2/Z3)/Z1=-Z1/(Z2/Z3);$$
and

If $Z2=Z1$, then $Zin=-Z3$.

Note that Zin may be scaled by changing the ratio of Z2/Z3. By making Zi less than the DC blocking capacitor 141 value, a corresponding portion of the capacitance of the DC blocking capacitor 141 can be electronically canceled. The degree of canceling can be increased as desired by increasing Zi. This allows a sufficient value of the DC blocking capacitor 141 to be compensated for without over-compensating. Generally, over-compensation could cause the DC blocking capacitor 141 to appear as a negative quantity thereby causing inherent instability of the circuit. A CODEC can be programmed to fine tune the compensation if so desirable as previously explained.

For purposes of discussion, assume that the goal is to get the capacitance of the compensation impedance Zin to within 100 nF of the capacitor's 141 value without exceeding that value (i.e., without over-compensating). However, the actual degree of compensation will depend on factors such as the range of fine tuning compensation that can be provided by the CODEC and the value of capacitor 141.

The negative impedance synthesis circuit can be adapted to render the synthesized impedance Zi as a function of frequency so that compensation is selectively provided depending on the frequency band. As such, the DSL band signals will see the physical capacitance of the capacitor 141, while the POTS band signals will see a modified capacitance of the capacitor 141. Note that although the negative impedance synthesis circuit 111 illustrated effectively decreases the capacitance of the capacitor 141, the circuit can also be adapted to increase the capacitance of the capacitor 141 is so desired.

In one embodiment, the frequency variant quality is provided by a low pass filter (not shown) connected in series with the non-inverting input of the op amp circuits 220a and 220b. Alternatively, the frequency variant quality can be provided by adding frequency dependence to the feedback networks. For example, impedance networks Z1 and Z2 may be implemented with passive or active circuitry so that they are frequency dependent and provide a desired filtering function. Regardless of how implemented, the negative impedance synthesis circuit 111 can be configured to be frequency variant.

Note that the negative impedance synthesis circuit 111 has a positive feedback to each side of the capacitor 141 that is monitored. As such, the circuit 111 maintains an in-phase tracking current thereby producing a means to reduce the effective impedance of the capacitor 141. Further note, however, that it is also possible to produce an inverting feedback version of circuit 111. In such an embodiment, the opposite side of the capacitor 141 is monitored. Since the driving voltage on the other side of the capacitor 141 is 180 degrees out of phase, the net result is two 180 degree shifts thereby producing a positive feedback to the other side and effectively reducing the capacitance of the capacitor 141.

Figure 2B:
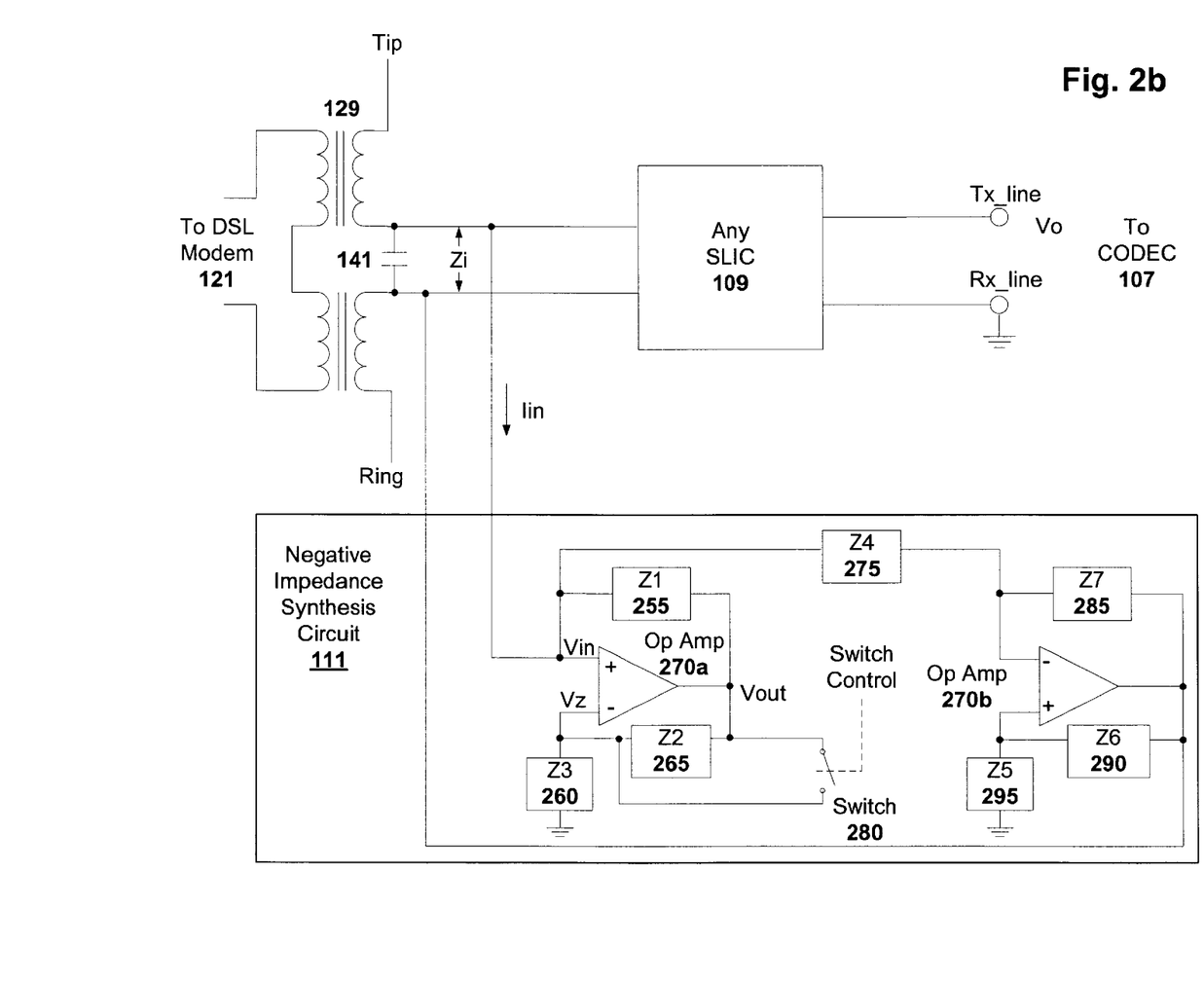
FIG. 2b illustrates a negative impedance synthesis circuit topology in accordance with another embodiment of the present invention.

FIG. 2b illustrates a negative impedance synthesis circuit topology in accordance with another embodiment of the present invention. This embodiment also includes two op amp circuits: one associated with tip (op amp 270a, Z1 255, Z2 265, and Z3 260) and the other with ring (op amp 270b, Z4 275, Z5 295, Z6 290 and Z7 285). A switch 280 in parallel with feedback impedance Z2 is included for the purposes of enabling and disabling the negative impedance synthesis circuit. A switch control function can be provided by a local host or processor so that the circuit 111 can be disabled is so desired.

In this embodiment, the compensation impedance Z3 can be a capacitor (i.e., compensation capacitor) that is scaled to compensate for the capacitor 141. Z3 may be scaled by changing the ratio of Z2/Z1. Z2 can be further configured with a frequency variant quality (e.g., low pass filter having corner frequency at about 4 kHz). In the second stage, Z7/Z4 determines the gain, and assuming unity gain is desirable, are equal. Z5 can be used to adjust for any input impedance difference of op amp 270b, but need not be included (i.e., non-inverting input of op amp 270b can be coupled directly to ground). Z6 is also optional, and need not be included unless it is desirable to provide additional frequency variance to that provided by Z2.

Figure 4:
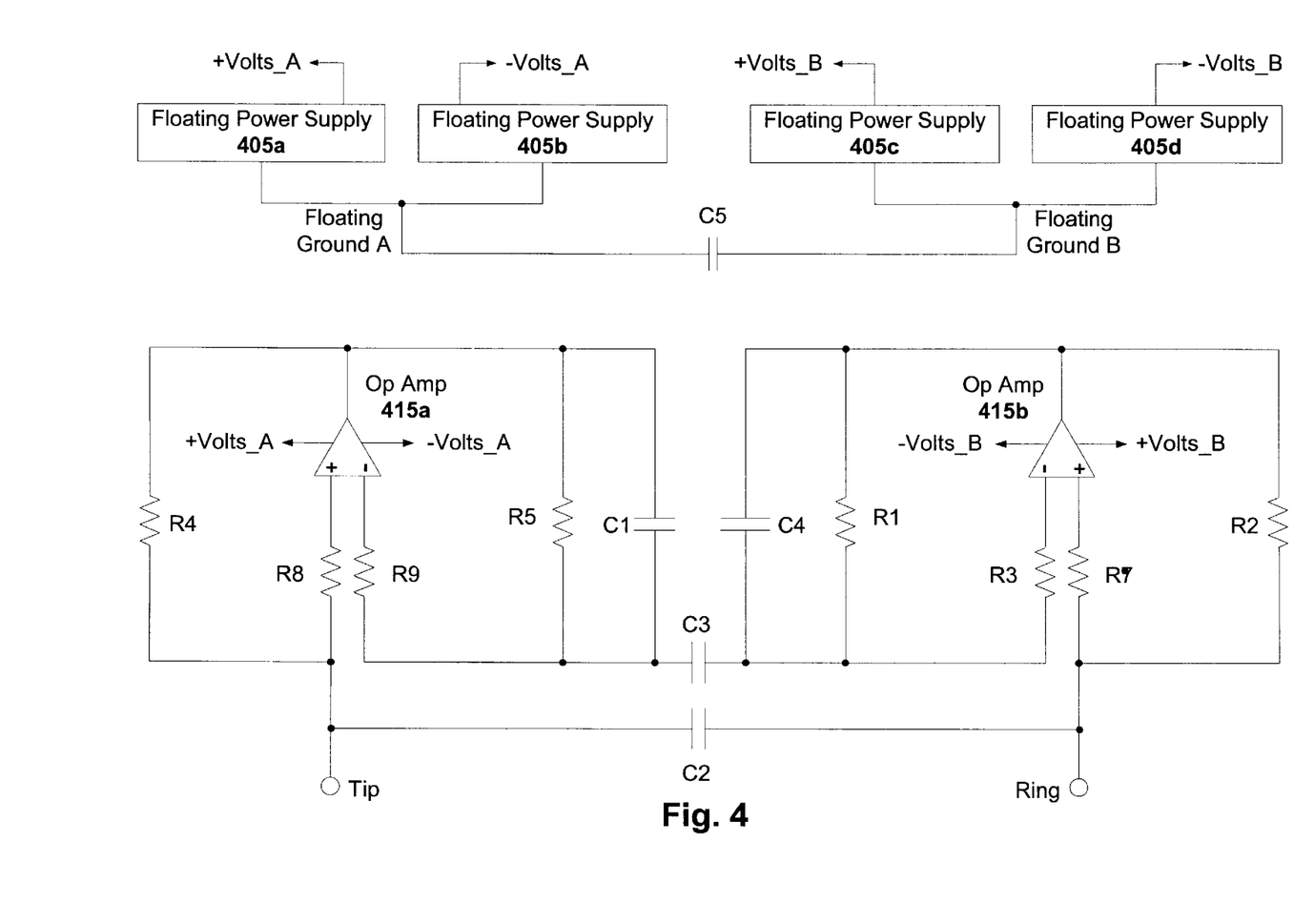
FIG. 4 illustrates a schematic of a negative impedance synthesis circuit in accordance with one embodiment of the present invention.

FIG. 4 illustrates a schematic diagram of a negative impedance synthesis circuit operatively coupled across the DC blocking capacitor C2 in accordance with one embodiment of the present invention. The circuit includes two similarly configured op amp circuits 415a and 415b, and floating power supplies 405a,b,c,d. This circuit represents an actual implementation of the topology illustrated in FIG. 2a, and may further include additional circuitry to adapt it to various applications based on factors such as industry and country requirements. As a preliminary matter, consider the following practical issues:

1. The tip and ring are typically operated with a battery voltage of approximately 48 volt potential (reversible) between them. The negative impedance synthesis circuit can therefore be configured to tolerate and operate in this range.
2. The tip and ring circuit is susceptible to longitudinal balance requirements. Thus, any electrical impact on the tip and ring circuit, with respect to ground, should occur in a substantially balanced manner. Otherwise, longitudinal interference will result in a metallic disturbance to the line thereby causing interference and violation of industry standards.
3. Ringing voltages may generate up to 250 volt transients, which the negative impedance synthesis circuit should survive.

To address the first issue, the negative impedance synthesis circuit is powered by floating power supplies 405a, b,c,d. In one embodiment, the floating power supplies 405a, b,c,d are implemented using a transformer as a means of generating the positive (+Volts__A and +Volts__B) and negative (−Volts__A and −Volts__B) supply rails to power the op amps 415. Note that the supplies are referenced to a floating ground, so that the op amp circuits 415a and 415b will float their DC references to the tip and ring voltages. Such a floating power supply scheme can be implemented with numerous conventional techniques, and the present invention is not intended to be limited to any one scheme.

To address the second issue, the negative impedance synthesis circuit is designed with a balanced topology, with the tip and the ring each having their own op amp circuit (415a and 415b, respectively). In addition, note that each op amp 415 has an independent power supply, so that each op amp 415 may float their DC potentials independently. The AC components of each op amp 415, on the other hand, are referenced to each other by tying the floating grounds A and B together with a capacitor C5, which provides an AC path for the compensation current. The balanced aspect of the two op amp 415 configuration prevents any imbalance in the compensation current, and avoids longitudinal balance problems.

The third issue can be addressed with conventional protection circuitry that prevent potentially hazardous voltages and currents from destroying the circuit.

The negative impedance synthesis circuit is shown as a balanced representation of capacitive cancellation topology. The two op amps 415 provide the source of the current that is used to cancel out (or otherwise compensated for) the capacitance of capacitor C2. In operation, capacitor C2 needs to be electrically present for DSL band frequencies, but compensated for at voice band (e.g., POTS) frequencies.

Each op amp 415 has a negative feedback network. In particular, the negative feedback network of op amp 415a includes resistor R5 and capacitor C1, and the negative feedback network of op amp 415b includes resistor R1 and capacitor C4. These networks provide a frequency dependent feedback, which enables a variable compensation of capacitor C2. In particular, the DC blocking capacitor C2 appears electrically at DSL band frequencies, but appears compensated for at voice band frequencies.

The amount of negative capacitance that is generated by the negative impedance synthesis circuit is equal to C3*(R5/R4) for tip, and symmetrically C3*(R1/R2) for ring. At DSL band frequencies, the reactances of capacitors C1 and C4 provide low impedance paths thereby minimizing compensation provided by the negative impedance synthesis circuit. In a more general sense, as signal frequency increases, the amount of compensation provided by the negative impedance synthesis circuit decreases. At voice band frequencies, however, compensation of capacitor C2 is realized.

The capacitor C5 provides an AC coupling path for the currents between the two op amp circuits 415a and 415b. This coupling completes the current loop for AC, but blocks the DC path. The floating power supplies 405a,b,c,d are therefore allowed to float with respect to each other, but AC compensation current has a complete path. Resistors R3, R7, R8, and R9 provide additional protection from potentially hazardous voltages and currents, such as voltage spikes associated with the ringing voltage.

In one embodiment, the following components are used in the negative impedance synthesis circuit: op amps 415a,b can be, for example, a matched pair of operational amplifiers (e.g., Analog Devices' AD648). C5=330 nF; C3=200 nF; C1 and C4=83 nF; R3, R7, R8 and R9=10 kOhms; and R1, R2, R4 and R5=220 Ohms. The capacitors may be, for example, 250 volt metalized polyester self-healing capacitors, while the resistors may be wirewound, 1 watt resistors. Component tolerances can be, for example, plus or minus one to five percent. Other component types, values and tolerances will be apparent in light of this disclosure, and the present invention is not intended to be limited to any one particular configuration or set of components.

These example component values could be used to compensate for the DC blocking capacitor C2, where C2 is approximately 250 nF and is a similar type and tolerance to capacitor C3. For POTS band frequencies (e.g., <4 kHz), the value of C2 would be adjusted or otherwise compensated to approximately 50 nF. At DSL band frequencies (e.g., >25 kHz), however, substantially all of the 250 nF value of C2 would be electrically present. Any further necessary compensation could be provided by a CODEC included in the POTS circuit as previously explained.

Because of the relatively high voltage (e.g., −48 Volt plus ringing voltage) nature of the tip and ring circuitry, the circuit is configured with a number of floating power supplies. Such a configuration allows the compensation circuit to float its DC ground reference thereby allowing that reference to rise and fall with the battery voltage. The ability of the floating power supplies 405a,b,c,d to be unreferenced to the local ground allows for the protection and proper operation of the negative impedance synthesis circuit during all battery configurations on a typical POTS circuit.

Figure 5:
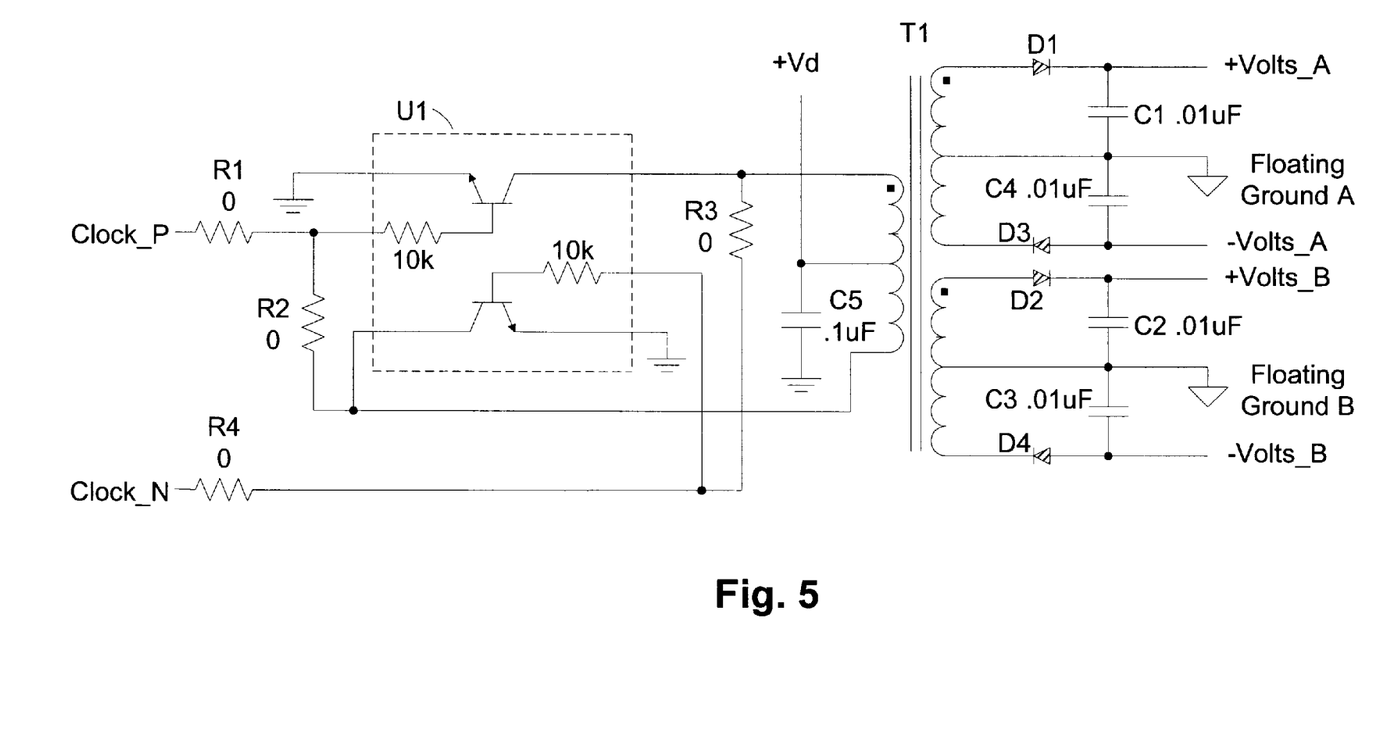
FIG. 5 illustrates a schematic of a floating power supply in accordance with one embodiment of the present invention.

The floating power supplies 405a,b,c,d have many different realizations depending on factors such as desired cost and size. As an example, a transformer based solution is illustrated in FIG. 5, and includes transformer T1, which has a primary winding and two secondary windings that have no metallic connection. The primary is driven by any AC source current. In one embodiment, complementary clock signals (e.g., >1 MHz) Clock__P and Clock__N are provided from, for example, a local host. In such an embodiment, R1 and R4 are connected (effectively short circuits or closed switches), and R2 and R3 are not connected (open circuits). The clock pulses activate switching network U1 (e.g., XN04215), which generates an AC current through T1.

In an alternative embodiment, the clock signals Clock__P and Clock__N need not be provided as U1 is configured as a self multivibrator (e.g., <1 MHz). Here, R2 and R3 are connected (effectively short circuits or closed switches), and R1 and R4 are not connected (open circuits). The multivibrator pulses activate switching network U1, which generates an AC current through T1.

The output voltages of T1 can be diode rectified (D1–D4), capacitively filtered (C1–C4), and supplied to the op amps 415a and 415b. In one embodiment, Vd is approximately equal to 12 volts DC, and +Volts__A and +Volts__B are each about 6 volts DC, and −Volts__A and −Volts__B are each about −6 volts DC. Each of the secondary windings floats and has no reference to the other windings, or to the primary source current supplied to the transformer. Note, however, that for the negative impedance synthesis circuit to provide a complete path for AC current that is being used to compensate for the capacitance of C2, it is necessary for there to be an AC (alternating current) path between the two op amps 415a and 414b. This is accomplished by connecting capacitor C5 between the floating grounds A and B, where C5 has a low impedance to AC compensation current, and allows the DC (direct current) references to float with respect to each other.

The foregoing description of the embodiments of the invention has been presented for the purposes of illustration and description. It is not intended to be exhaustive or to limit the invention to the precise form disclosed. Many modifications and variations are possible in light of the above disclosure.

For example, it will be apparent from this disclosure that the present invention is not intended to be limited to POTS, but can be applied to other voice services such as Special Services as well (e.g., Foreign Exchange Subscriber (FXS)). Numerous such voice processing applications and corresponding voice circuitry can be combined with a DSL application in accordance with the principles of the present invention. Voice and DSL structural impedances are maintained at their rated values so that the reflected power losses can be kept at a minimum at the voice and DSL operational frequencies.

It is intended that the scope of the invention be limited not by this detailed description, but rather by the claims appended hereto.

What is claimed is:

1. A device configured to compensate for a DC blocking capacitor coupled across the two-wire interface of a voice circuit included in a splitterless central office interface, the device comprising:

a first operational amplifier adapted to couple with a first wire of the two-wire interface; and a second operational amplifier adapted to couple with a second wire of the two-wire interface;

wherein at least one of the first and second operational amplifiers has a frequency variant feedback network that allows the device to selectively synthesize a capacitive impedance that compensates for the DC blocking capacitor coupled across the two-wire interface of a voice circuit.

2. The device of claim 1 further comprising:

a first power supply having a first floating ground for providing power to at least one of the first and second operational amplifiers;

a second power supply having a second floating ground for providing power to at least one of the first and second operational amplifiers, and wherein the first floating ground is capacitively coupled to the second floating ground.

3. The device of claim 1, wherein a non-inverting input of the first operational amplifier is adapted to receive signals from the first wire and a non-inverting input of the second operational amplifier is adapted to receive signals from the second wire.

4. The device of claim 1 wherein a first frequency variant feedback network is operatively coupled between an inverting input of the first operational amplifier and its output, and a second frequency variant feedback network is operatively coupled between an inverting input of the second operational amplifier and its output.

5. The device of claim 1 further including a capacitor operatively coupled to inverting inputs of the first and second operational amplifiers, the capacitor having an impedance tat is scaled by operation of the first and second operation amplifiers thereby canceling impedance of the DC blocking capacitor.

6. The device of claim 1 wherein the one or more frequency variant feedback networks allow the DC blocking capacitor to appear electrically in response to DSL band frequencies, and appear compensated for in response to voice band frequencies.

7. The device of claim 1 wherein the two-wire interface includes a SLIC, and the device is adapted to operate independent of the SLIC.

8. A device for compensating for a capacitor coupled across the two-wire interface of a voice circuit included in a splitterless central office interface, the device comprising:

an impedance synthesis circuit adapted to couple across the two-wire interface of the voice circuit, the circuit having one or more frequency variant feedback networks that allow the device to selectively synthesize a capacitive impedance that compensates for the capacitor coupled across the two-wire interface of a voice circuit;

a first power supply having a first floating ground for providing power to the impedance synthesis circuit; and a second power supply having a second floating ground for providing power to the impedance synthesis circuit;

wherein the first floating ground is capacitively coupled to the second floating ground.

9. The device of claim 8 wherein the impedance synthesis circuit includes first and second operational amplifiers, and a first frequency variant feedback network is operatively coupled between an inverting input of the first operational amplifier and its output, and a second frequency variant feedback network is operatively coupled between an inverting input of the second operational amplifier and its output.

10. The device of claim 8 wherein the impedance synthesis circuit includes a compensation capacitor operatively coupled to inverting inputs of first and second operational amplifiers, the compensation capacitor having an impedance that is scaled by operation of the impedance synthesis circuit thereby canceling impedance of the capacitor coupled across the two-wire interface of a voice circuit.

11. The device of claim 8 wherein the one or more frequency variant feedback networks allow the capacitor coupled across the two-wire interface of a voice circuit to appear electrically in response to DSL band frequencies, and to appear compensated for in response to voice band frequencies.

12. The device of claim 8 wherein the two-wire interface includes a SLIC, and the device is adapted to operate independent of the SLIC.

* * * * *

UNITED STATES PATENT AND TRADEMARK OFFICE
CERTIFICATE OF CORRECTION

PATENT NO. : 6,760,433 B2
DATED : July 6, 2004
INVENTOR(S) : Mark A. Bolla et al.

It is certified that error appears in the above-identified patent and that said Letters Patent is hereby corrected as shown below:

<u>Title page,</u>
Item [57], ABSTRACT, line 2, please insert -- voice -- after "providing"

<u>Column 12,</u>
Line 2, "tat" should be -- that --

Signed and Sealed this

Seventh Day of September, 2004

JON W. DUDAS
*Director of the United States Patent and Trademark Office*